United States Patent
Iijima et al.

(10) Patent No.: US 11,334,073 B2
(45) Date of Patent: May 17, 2022

(54) AUTONOMOUS DRIVING DEVICE (71) Applicant: TOYOTA JIDOSHA KABUSHIKI KAISHA, Toyota (JP)

(72) Inventors: Akira Iijima, Nagoya (JP); Hiroaki Sakakibara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 213 days.

(21) Appl. No.: 16/591,990

(22) Filed: Oct. 3, 2019

(65) Prior Publication Data

US 2020/0159218 A1  May 21, 2020

(30) Foreign Application Priority Data

Nov. 19, 2018 (JP) .............................. JP2018-216304

(51) Int. Cl.
*G05D 1/00* (2006.01)
*G01C 21/34* (2006.01)

(52) U.S. Cl.
CPC ....... *G05D 1/0088* (2013.01); *G01C 21/3415* (2013.01); *G05D 2201/0213* (2013.01)

(58) Field of Classification Search
CPC ......... G05D 1/0088; G05D 2201/0213; G05D 1/0251; G05D 1/0257; G05D 1/0223; G05D 1/0276; G05D 2201/02; G01C 21/3415; G01C 21/3492
See application file for complete search history.

(56) References Cited

U.S. PATENT DOCUMENTS

| | | | | |
|---|---|---|---|---|
| 2004/0044470 A1* | 3/2004 | Matsuoka | .......... | G01C 21/3415 701/533 |
| 2004/0204846 A1 | 10/2004 | Yano et al. | | |
| 2008/0071471 A1* | 3/2008 | Sumizawa | ......... | G01C 21/3667 701/414 |
| 2009/0024320 A1* | 1/2009 | Nakamura | ....... | G08G 1/096827 701/414 |
| 2010/0036606 A1* | 2/2010 | Jones | .................... | G06Q 10/047 701/533 |
| 2010/0094537 A1* | 4/2010 | Goto | .................. | G01C 21/3415 701/533 |

FOREIGN PATENT DOCUMENTS

| | | | | |
|---|---|---|---|---|
| CN | 107953884 A | * | 4/2018 | ............. G08G 1/167 |
| JP | 2003-232645 A | | 8/2003 | |
| JP | 2012002572 A | * | 1/2012 | |
| KR | 20130133455 A | * | 12/2013 | |
| WO | WO 2018/087801 A1 | | 5/2018 | |

* cited by examiner

*Primary Examiner* — Marthe Y Marc-Coleman
(74) *Attorney, Agent, or Firm* — Oblon, McClelland, Maier & Neustadt, L.L.P.

(57) ABSTRACT

An autonomous driving device includes a navigation device configured to search a plurality of routes, from a diverging point to a target position, for one or more extra routes other than a recommended route before a vehicle passes the diverging point wherein the diverging point is a point where the vehicle is expected to pass; and an electronic control unit configured to control autonomous driving of the vehicle based on information on a particular extra route when the vehicle departs from the recommended route at the diverging point and travels on the particular extra route wherein the particular extra route is one of the one or more extra routes.

6 Claims, 5 Drawing Sheets

AUTONOMOUS DRIVING DEVICE

INCORPORATION BY REFERENCE

The disclosure of Japanese Patent Application No. 2018-216304 filed on Nov. 19, 2018 including the specification, drawings and abstract is incorporated herein by reference in its entirety.

BACKGROUND

1. Technical Field

The present disclosure relates to an autonomous driving device.

2. Description of Related Art

In recent years, research and development on autonomous driving of an automobile has been underway. The autonomous levels of autonomous driving are classified into the following five levels: manual driving (level 0), assisted driving (level 1), partial autonomous driving (level 2), conditional autonomous driving (level 3), highly autonomous driving (level 4), and fully autonomous driving (level 5). The higher the autonomous level is, the more important is the cooperation between the electronic control unit, which controls autonomous driving, and the navigation device. As this type of navigation device, a navigation device having the reroute function, such as the one described in Japanese Patent Application Publication No. 2003-232645 (JP 2003-232645 A), is conventionally known. The reroute function is a function that, when a vehicle departs from a recommended route leading to a target position, searches for and recommends an extra route leading to the target position.

SUMMARY

However, a certain search time is required from the time the reroute function is activated to the time the search for an extra route to the target position is completed. This means that, before the search for an extra route by the reroute function is completed, the electronic control unit, which controls autonomous driving based on the information on the route to the target position searched for by the navigation device, cannot receive the information on an extra route to the target position from the navigation device. Therefore, the reroute function, when activated, temporarily interrupts the cooperation between the electronic control unit, which controls autonomous driving, and the navigation device, causing the electronic control unit to temporarily control the autonomous driving in such a way that the vehicle will follow the way.

The present disclosure provides an autonomous driving device that can prevent an interruption of cooperation between the electronic control unit, which controls autonomous driving, and the navigation device.

To solve the problems described above, an autonomous driving device in one aspect of the present disclosure includes a navigation device configured to search a plurality of routes, from a diverging point to a target position, for one or more extra routes other than a recommended route before a vehicle passes the diverging point, the diverging point being a point where the vehicle is expected to pass; and an electronic control unit configured to control autonomous driving of the vehicle based on information on a particular extra route when the vehicle departs from the recommended route at the diverging point and travels on the particular extra route, the particular extra route being one of the one or more extra routes. This eliminates the need to search for an extra route when the vehicle departs from the recommended route at the diverging point, preventing an interruption of cooperation between the electronic control unit and the navigation device.

An autonomous driving device in another aspect of the present disclosure includes a navigation device configured to receive from a route search server a result of searching a plurality of routes, from a diverging point to a target position, for one or more extra routes other than a recommended route before a vehicle passes the diverging point, the diverging point being a point where the vehicle is expected to pass; and an electronic control unit configured to control autonomous driving of the vehicle based on information on a particular extra route when the vehicle departs from the recommended route at the diverging point and travels on the particular extra route, the particular extra route being one of the one or more extra routes. This eliminates the need to search for an extra route when the vehicle departs from the recommended route, preventing an interruption of cooperation between the electronic control unit and the navigation device.

The autonomous driving device according to the present disclosure can prevent an interruption of cooperation between an electronic control unit, which controls autonomous driving, and a navigation device.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
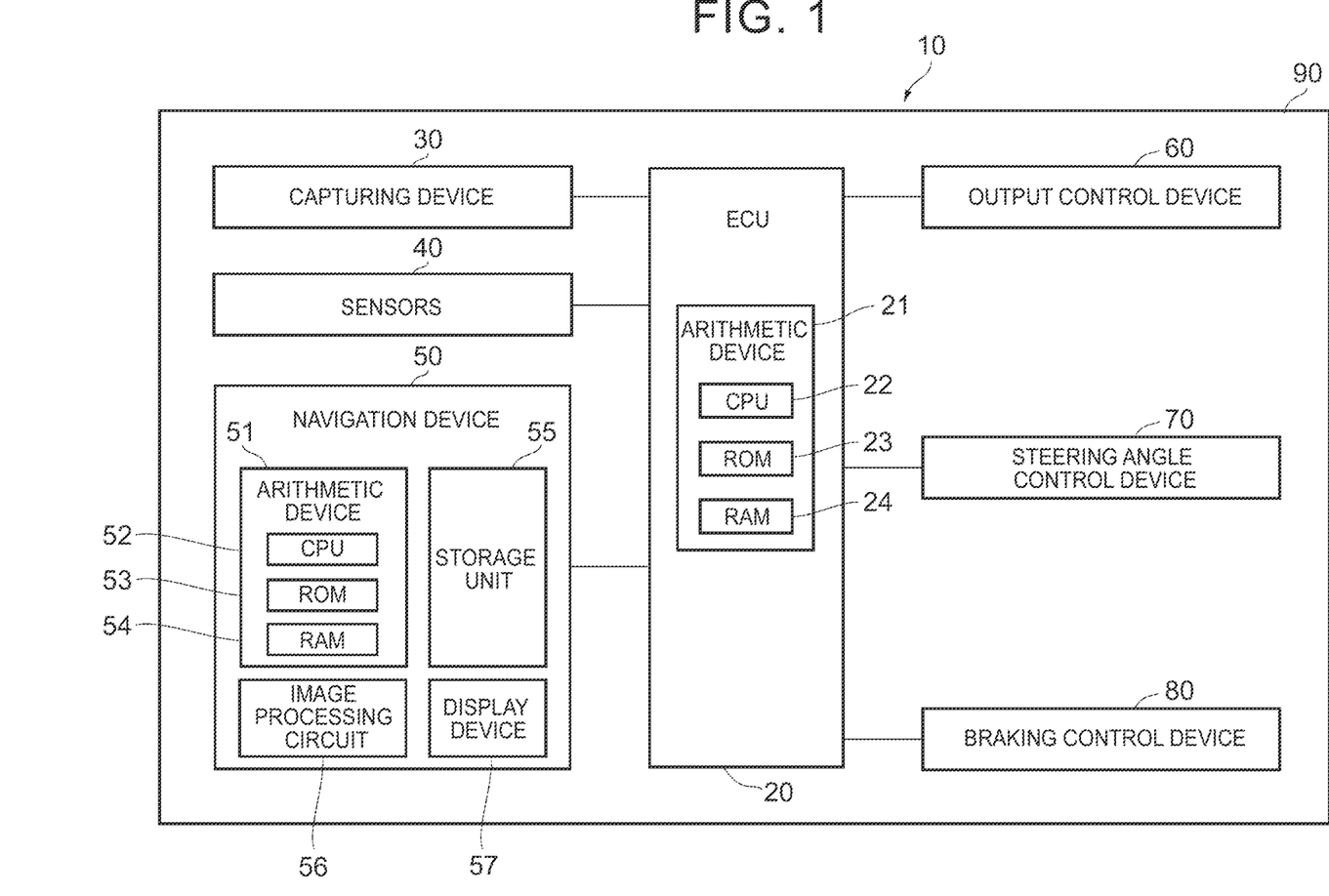
FIG. 1 is a diagram showing a configuration of an autonomous driving device according to a first embodiment of the present disclosure.

Embodiments of the present disclosure will be described below with reference to the drawings. In the description below, the same reference numeral indicates the same component and redundant description will be omitted. FIG. 1 is a diagram showing a configuration of an autonomous driving device 10 according to a first embodiment of the present disclosure. The autonomous driving device 10, mounted on a vehicle 90, is configured to control the traveling of the vehicle 90. The vehicle 90 is, for example, a private vehicle or a commercial vehicle. The autonomous driving device 10 allows the driver to switch the driving control mode of the vehicle 90 between the autonomous driving mode and the manual driving mode. The autonomous driving mode means a driving mode in which the vehicle 90 is driven autonomously along a recommended route from the current position to the target position. In the autonomous driving mode, the vehicle 90 is driven, not by the driver, but autonomously in most cases. The manual driving mode means a driving mode in which the vehicle 90 is driven by the driver in most cases.

The autonomous driving device 10 includes an electronic control unit (ECU) 20, a capturing device 30, sensors 40, a navigation device 50, an output control device 60, a steering angle control device 70, and a braking control device 80.

The capturing device 30 is a camera including an image sensor that captures a situation around the vehicle 90 (for example, the situation ahead of, to the sides of, and behind the vehicle). The capturing device 30 captures the situation around the vehicle 90 in response to an instruction from the electronic control unit 20. The image information, obtained by the capturing device 30, may be a still image or a moving image.

The sensors 40 detect various types of information, used to control the driving of the vehicle 90, in response to an instruction from the electronic control unit 20. The sensors 40 may include a position detector (e.g., a global positioning system) that detects the position of the vehicle 90. The sensors 40 may include a gyro sensor that detects an angular velocity associated with a change in the traveling direction of the vehicle 90. The sensors 40 may include a travel distance sensor that detects the traveling speed or travel distance of the vehicle 90. The sensors 40 may include a steering angle sensor that detects the steering angle of the vehicle 90. The sensors 40 may include a radar that detects the traveling conditions of other vehicles traveling around the vehicle 90 or the presence of an obstacle. The radar detects the position and the relative speed of a preceding vehicle or an obstacle, for example, by sending a millimeter wave in the traveling direction of the vehicle 90 and by receiving a millimeter wave reflected from the preceding vehicle or the obstacle.

The navigation device 50 includes an arithmetic device 51, a storage device 55, an image processing circuit 56, and a display device 57. The navigation device 50 performs navigation processing (for example, setting of search base points, search for a recommended route, search for an extra route, generation and output of route information) based on the various types of information output from the sensors 40 (for example, the position, speed, and traveling direction of the vehicle 90). More specifically, the navigation processing performed by the navigation device 50 is as follows. The setting of search base points refers to the processing in which the navigation device 50 obtains the coordinates (longitude and latitude) of the positions of the base points of a recommended route search such as the start position, target position, and waypoint. The search for a recommended route refers to the processing in which the navigation device 50 first sets the search range of a recommended route using the route search base points such as the start position, target position, and waypoint and then, within the search range that has been set, searches for a recommended route that satisfies the search condition. The search for an extra route refers to the processing in which the navigation device 50 searches for an alternative route that is used as an alternative to a recommended route to the target position. An extra route and an alternative route are synonymous. The generation and output of route information refers to the processing in which the navigation device 50 generates and outputs the image signal for route guidance.

A road section from one intersection to another is treated as a graph link in terms of graph theory, and an intersection as a graph node. In this specification, a "route" is a generic term for a recommended route and an extra route, and the "information on a route (route information)" means connection information on the links of a route.

The arithmetic device 51 includes a central processing unit (CPU) 52, a read only memory (ROM) 53, and a random access memory (RAM) 54. The ROM 53 stores a navigation program for executing the navigation processing described above. The navigation program is read from the ROM 53 into the RAM 54 for interpretation and execution by the CPU 52.

The storage device 55 is a disk medium (for example, a magnetic recording medium or a magneto-optical recording medium) that stores high accuracy map information. The high accuracy map information includes, for example, the information related to the connection relationship of roads. The high accuracy map information is map information that is more accurate than the ordinary map information for navigation. The high accuracy map information includes, for example, the information indicating the center position of a lane, the information indicating the boundaries between the lanes, and the like. In addition, the high accuracy map information may include the road information, traffic regulation information, address information (address/zip code), facility information, or telephone number information. The road information includes the information on the type of a road (such as expressway, toll road, national road, and prefectural road) and the information on the number of lanes of a road, the width of each lane, the slope of a road, the position of a road (three-dimensional coordinates including the longitude, latitude, and height), the curvature of a curve of a lane, the position of the merging and diverging points of a lane, or the signs provided on a road. The traffic regulation information includes the information indicating that a lane is blocked due to construction works, traffic accidents, or traffic jams.

The image processing circuit 56 includes a buffer memory and a graphic controller. The image processing circuit 56 expands the map information, read from the storage device 55, into the buffer memory, generates an image signal for recommending a route by means of the graphic controller, and displays the generated image on the display device 57. The display device 57 is, for example, a liquid crystal display.

In the manual driving mode, the navigation device 50 guides the driver of the vehicle 90 to a recommended route leading to the target position. In the autonomous driving mode, the navigation device 50 provides the electronic control unit 20 with the information on the recommended route to the target position (i.e., connection information on the links constituting the recommended route). The electronic control unit 20 controls the autonomous driving of the vehicle 90 to the target position based on the information on the recommended route provided by the navigation device 50.

The electronic control unit 20 is a controller that controls the autonomous driving of the vehicle 90. The electronic control unit 20 includes an arithmetic device 21 as its hardware resource. The arithmetic device 21 includes a CPU 22, a ROM 23, and a RAM 24. The ROM 23 stores the autonomous driving program for controlling the autonomous driving of the vehicle 20. The autonomous driving program is read from the ROM 23 into the RANI 24 for interpretation and execution by the CPU 22. The electronic control unit 20, in which its hardware resource and the autonomous driving program cooperate with each other, functions as the autonomous driving controller. The functions of the autonomous driving controller may be implemented by a single electronic control unit or by a plurality of electronic control units that are mutually connected through an in-vehicle communication network (e.g., controller area network or Ethernet (registered trademark) network). The function of the autonomous driving controller may be implemented by a dedicated hardware resource or by firmware. The dedicated hardware resources is, for example, an application specific integrated circuit (ASIC) or a field programmable gate array (FPGA).

The output control device 60 is an electronic control unit that controls the output of the power source (for example, the engine or the traction motor) of the vehicle 90. The output control device 60 controls the output of the power source of the vehicle 90 in response to an instruction from the electronic control unit 20.

The steering angle control device 70 is an electronic control unit that controls the electric power steering system of the vehicle 90. The assist motor of the electric power steering system generates a steering torque. The steering angle control device 70 controls the steering angle of the vehicle 90 by controlling the assist motor in response to an instruction from the electronic control unit 20.

The braking control device 80 is an electronic control unit that controls the brake system of the vehicle 90. The brake system is, for example, a hydraulic brake system. The braking control device 80 controls the braking force of the vehicle 90 by adjusting the hydraulic pressure of the hydraulic brake system in response to an instruction from the electronic control unit 20.

When the driving control mode of the vehicle 90 is set to the autonomous driving mode, the electronic control unit 20 recognizes the situation around the vehicle 90, based on the image information on the situation around the vehicle 90 captured by the capturing device 30, various types of information detected by the sensors 40 (for example, the information such as the position, speed, and traveling direction of the vehicle 90), and the recommended route information provided by the navigation device 50. While recognizing the situation around the vehicle 90 in this way, the electronic control unit 20 controls the autonomous driving of the vehicle 90 by outputting an instruction to the output control device 60, the steering angle control device 70, and the braking control device 80 so that the vehicle 90 travels toward the target position.

The electronic control unit 20, capturing device 30, sensors 40, navigation device 50, output control device 60, steering angle control device 70, and braking control device 80 are connected through an in-vehicle communication network.

Figure 2:
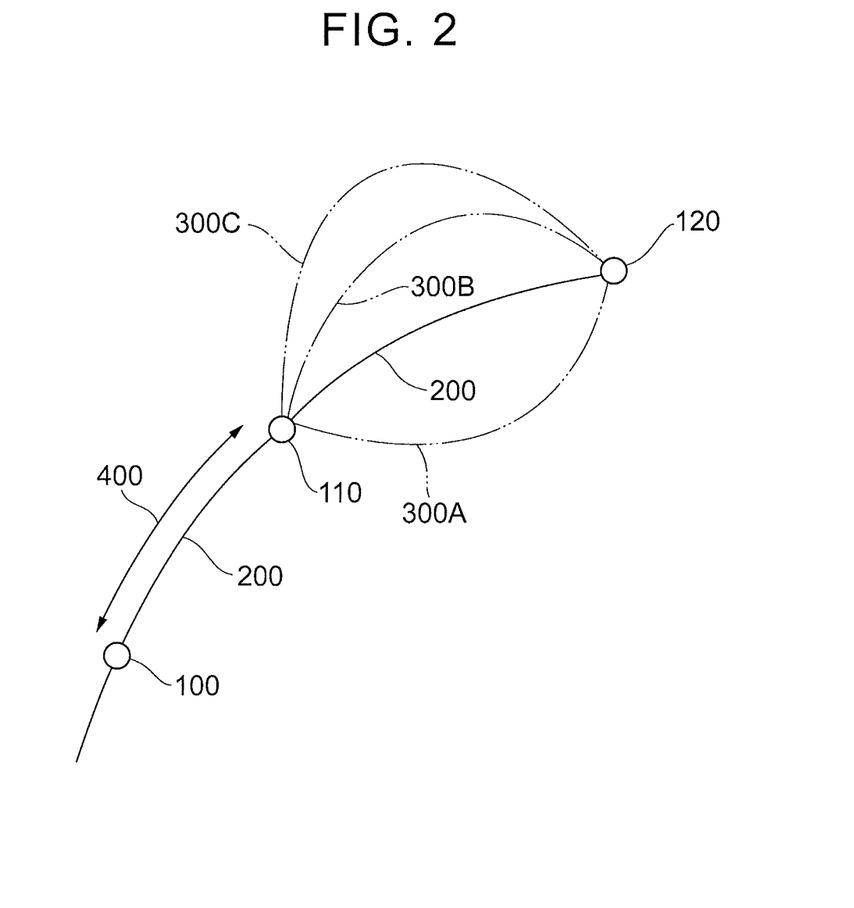
FIG. 2 is a diagram showing an example of the outline of navigation processing according to the first embodiment of the present disclosure.

FIG. 2 is a diagram showing an example of the outline of navigation processing according to the first embodiment of the present disclosure. In the figure, the reference numeral 100 indicates the current position of the vehicle 90, the reference numeral 120 indicates the target position of the vehicle 90, and the reference numeral 200 indicates a recommended route from the current position 100 to the target position 120. The reference numeral 110 indicates a diverging point on the recommended route 200 where the vehicle 90 is expected to pass. The diverging point 110 is, for example, a junction of an expressway or an intersection of an open road.

The navigation device 50 searches a plurality of routes, from the diverging point 110 to the target position 120, for one or more extra routes 300A, 300B, and 300C other than the recommended route 200. The navigation device 50 may start searching for one or more extra routes 300A, 300B, and 300C, for example, when the distance 400 between the current position 100 of the vehicle 90 and the diverging point 110 becomes shorter than a threshold distance. The threshold distance is, for example, a distance equal to or greater than the distance that the vehicle 90 will travel from the time the navigation device 50 starts searching for the extra route 300A, 300B, and 300C to the time the search is completed. For example, the threshold distance is determined considering the vehicle speed of the vehicle 90, the estimated time required to search for the extra routes 300A, 300B, and 300C, and traffic information (for example, traffic jam information). By determining the threshold distance in this way, the navigation device 50 can complete the search for one or more extra routes 300A, 300B, and 300C before the vehicle 90 passes the diverging point 110.

The navigation device 50 reads the information on each of one or more extra routes 300A, 300B, and 300C (connection information on the links of each of the extra routes 300A, 300B, and 300C) from the storage device 55 and provides the information, which has been read, to the electronic control unit 20. The electronic control unit 20 temporarily stores the information on each of the one or more extra routes 300A, 300B, and 300C, provided by the navigation device 50, in the RAM 24.

Assume that the vehicle 90 has departed from the recommended route 200 at the diverging point 110 and is going to travel one particular extra route that is one of the one or more extra routes 300A, 300B, and 300C (in this example, extra route 300B). In this case, the electronic control unit 20 reads the information on the particular extra route 300B (connection information on the links of the extra route 300B) from the RAM 24 and, based on the information that has been read, controls the autonomous driving of the vehicle 90. This eliminates the need for the navigation device 50 to search for an extra route when the vehicle 90 departs from the recommended route 200, preventing an interruption of cooperation between the electronic control unit 20 and the navigation device 50.

Figure 3:
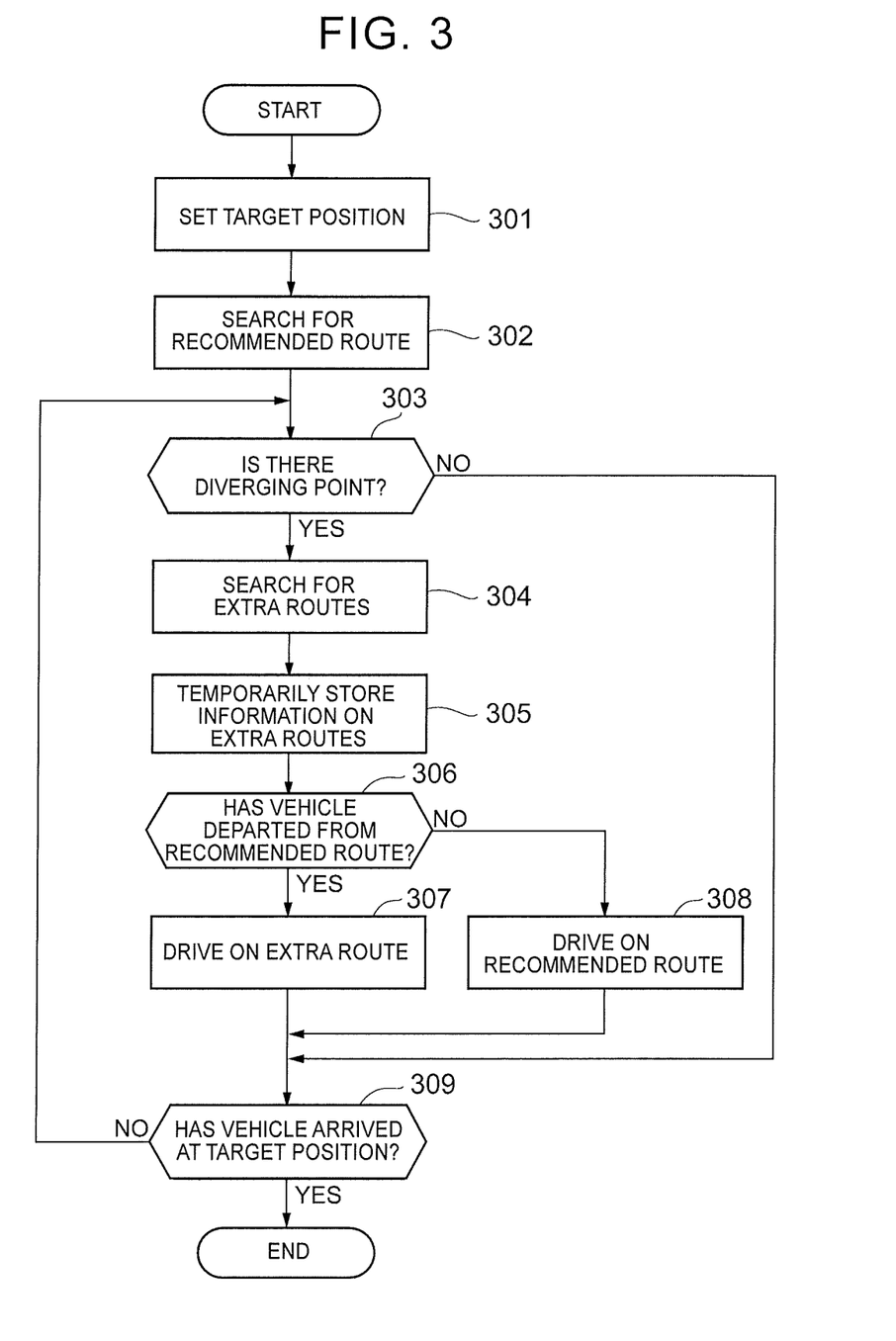
FIG. 3 is a flowchart showing an example of the navigation processing according to the first embodiment of the present disclosure.

FIG. 3 is a flowchart showing an example of the navigation processing according to the first embodiment of the present disclosure. This flowchart shows an example in which the vehicle 90 travels from the current position 100 to the target position 120 in the autonomous driving mode.

In step 301, the navigation device 50 sets the target position 120 based on the information specified by an occupant of the vehicle 90.

In step 302, the navigation device 50 searches for a recommended route 200 from the current position 100 to the target position 120. When a plurality of candidates for the recommended route 200 are searched for by the navigation device 50, the occupant of the vehicle 90 may select one of the plurality of candidates. The electronic control unit 20 controls the autonomous driving of the vehicle 90 to the target position based on the information on the recommended route 200 provided by the navigation device 50.

In step 303, the navigation device 50 determines whether there is the diverging points 110 in the traveling direction of the vehicle 90. In step 303, the navigation device 50 determines whether there is the diverging point 110 that is one of a plurality of diverging points 110 on the recommended route 200 and is a diverging point where the vehicle 90 is expected to pass within a predetermined time.

In step 304, the navigation device 50 searches a plurality of routes, from the diverging point 110 to the target position 120, for one or more extra routes 300A, 300B, and 300C other than the recommended route 200. The navigation device 50 reads the information on each of the one or more extra routes 300A, 300B, and 300C from the storage device 55 and provides the information, which has been read, to the electronic control unit 20. The processing in step 304 is repeated the number of times corresponding to the number of diverging points 110 where the vehicle 90 is expected to pass.

In step 305, the electronic control unit 20 temporarily stores in the RAM 24 the information on each of the one or more extra routes 300A, 300B, and 300C provided by the navigation device 50.

In step 306, the navigation device 50 determines whether the vehicle 90 has departed from the recommended route 200 at the diverging point 110.

In step 307, the electronic control unit 20 reads, from the RAM 24, the information on a particular extra route 300B which is one of the one or more extra routes 300A, 300B, and 300C and on which the vehicle 90 will travel after departing from the recommended route 200. Based on the information that has been read, the electronic control unit 20 controls the autonomous driving of the vehicle 90.

In step 308, the electronic control unit 20 controls the autonomous driving of the vehicle 90 to the target position based on the information on the recommended route 200 provided by the navigation device 50.

In step 309, the navigation device 50 determines whether the vehicle 90 has arrived at the target position 120.

According to the first embodiment of the present disclosure, before the vehicle 90 passes the diverging point 110 where the vehicle 90 is expected to pass, the navigation device 50 searches, in advance, a plurality of routes, from the diverging point 110 to the target position 120, for one or more extra routes 300A, 300B, and 300C other than the recommended route 200. The navigation device 50 can temporarily store the information on the extra routes 300A, 300B, and 300C, which has been searched for, in the RAM 24 of the electronic control unit 20. This eliminates the need to search for the extra routes 300A, 300B, and 300C when the vehicle 90 departs from the recommended route 200 at the diverging point 110, preventing an interruption of cooperation between the electronic control unit 20 and the navigation device 50.

Figure 4:
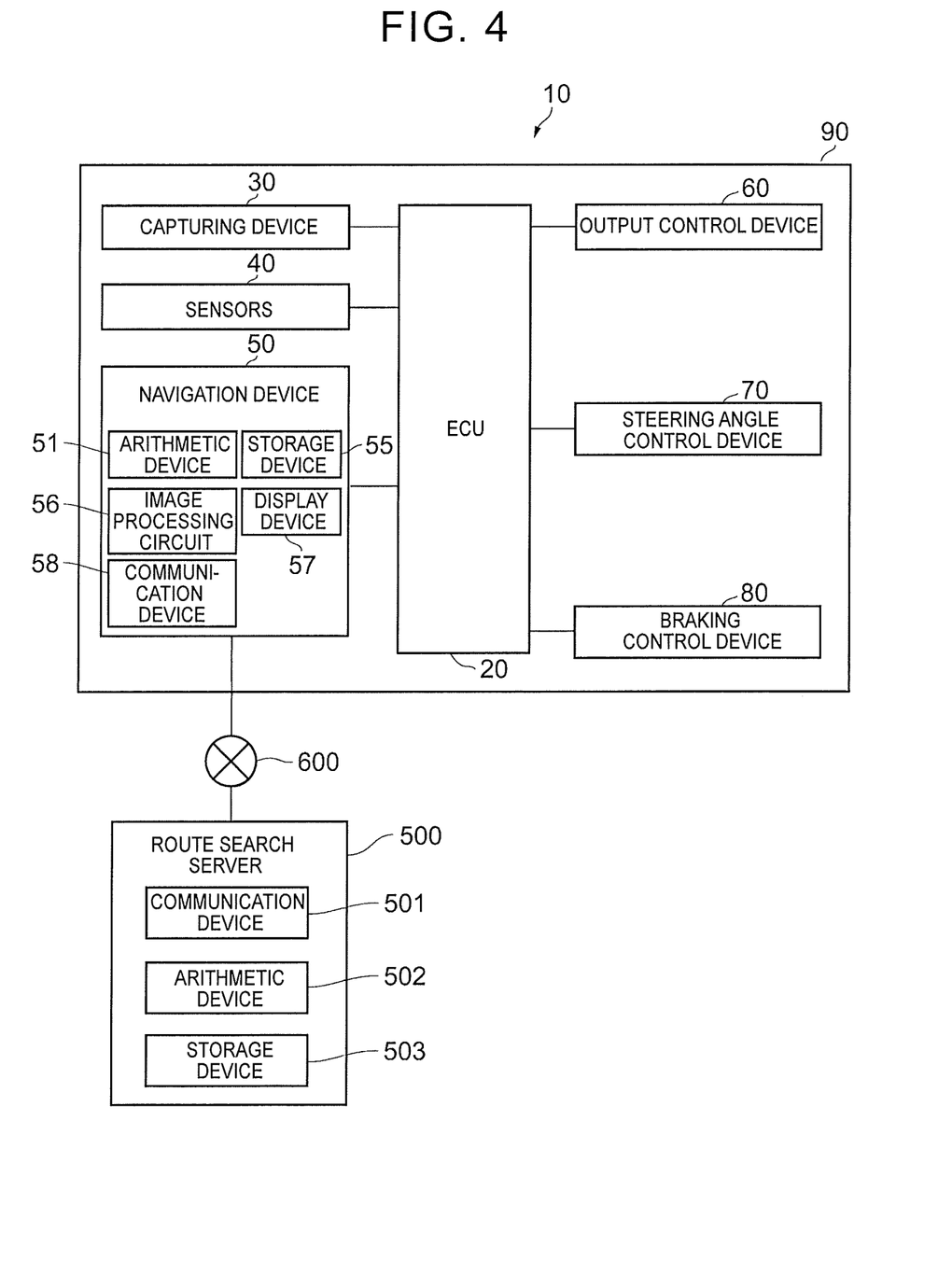
FIG. 4 is a diagram showing a configuration of an autonomous driving device according to a second embodiment of the present disclosure.

FIG. 4 is a diagram showing a configuration of an autonomous driving device 10 according to a second embodiment of the present disclosure. In the present disclosure, the first embodiment and the second embodiment are the same except that a route search is performed by the navigation device 50 in the first embodiment but by a route search server 500 in the second embodiment. The following description will focus on the differences between the two, and a description of the common points will be omitted.

A navigation device 50 includes a communication device 58 that wirelessly communicates with the route search server 500 through a network 600. The network 600 is, for example, a mobile communication network. The route search server 500 includes a communication device 501, an arithmetic device 502, and a storage device 503. These hardware resources are equivalent to the communication device 58, the arithmetic device 51, and the storage device 55 of the navigation device 50 respectively. The storage device 503 stores map information.

Figure 5:
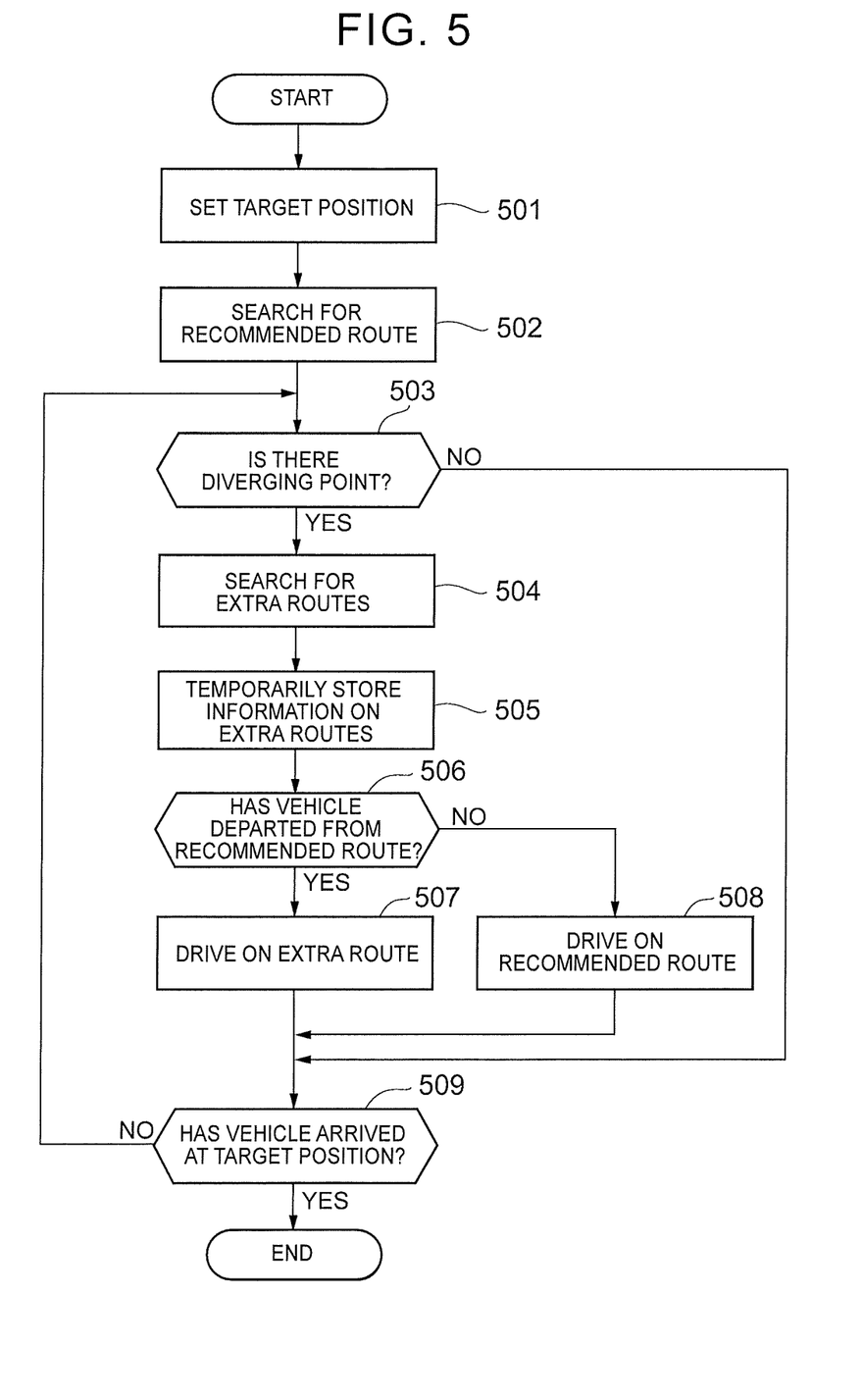
FIG. 5 is a flowchart showing an example of the navigation processing according to the second embodiment of the present disclosure.

FIG. 5 is a flowchart showing an example of the navigation processing according to the second embodiment of the present disclosure. In the description below, an example is shown in which the vehicle 90 travels from the current position 100 to the target position 120 in the autonomous driving mode. It is assumed that the navigation device 50 notifies the route search server 500 of the position information on the vehicle 90 at regular intervals.

In step 501, when a request for setting the target position 120 specified by an occupant of the vehicle 90 is received, the navigation device 50 requests the route search server 500 to search for a recommended route from the current position 100 to the target position 120.

In step 502, the route search server 500 searches for a recommended route 200 from the current position 100 to the target position 120. When a plurality of candidates for the recommended route 200 are searched for by the route search server 500, the occupant of the vehicle 90 may select one of the plurality of candidates. The route search server 500 provides the information on the recommended route 200 to the navigation device 50. The navigation device 50 provides the information on the recommended route 200 to the electronic control unit 20. The electronic control unit 20 controls the autonomous driving of the vehicle 90 to the target position based on the information on the recommended route 200 provided by the navigation device 50.

In step 503, the route search server 500 determines whether there is the diverging point 110 in the traveling direction of the vehicle 90. In step 503, the route search server 500 determines whether there is the diverging point 110 that is one of the plurality of diverging points 110 on the recommended route 200 and is a diverging point where the vehicle 90 is expected to pass within a predetermined time.

In step 504, the route search server 500 searches a plurality of routes, from the diverging point 110 to the target position 120, for one or more extra routes 300A, 300B, and 300C other than the recommended route 200. The route search server 500 may start searching for one or more extra routes 300A, 300B, and 300C, for example, when the distance 400 between the current position 100 of the vehicle 90 and the diverging point 110 becomes shorter than a threshold distance. The threshold distance is, for example, a distance equal to or greater than the distance that the vehicle 90 will travel from the time the route search server 500 starts searching for the extra route 300A, 300B, and 300C to the time the search is completed. For example, the threshold distance is determined considering the vehicle speed of the vehicle 90, the estimated time required to search for the extra routes 300A, 300B, and 300C, the time required for communication between the navigation device 50 and the route search server 500, and traffic information (for example, traffic jam information). Determining the threshold distance in this way allows the route search server 500 to complete the search for one or more extra routes 300A, 300B, and 300C before the vehicle 90 passes the diverging point 110. The route search server 500 reads the information on each of one or more extra routes 300A, 300B, and 300C, which have been searched for, from the storage device 503 and provides the information, which has been read, to the navigation device 50. The navigation device 50 provides the information on each of the one or more extra routes 300A, 300B, 300C to the electronic control unit 20. The processing in step 504 is repeated the number of times corresponding to the number of diverging points 110 where the vehicle 90 is expected to pass.

In step 505, the electronic control unit 20 temporarily stores in the RAM 24 the information on each of the one or more extra routes 300A, 300B, and 300C provided by the navigation device 50.

In step 506, the route search server 500 determines whether the vehicle 90 has departed from the recommended route 200 at the diverging point 110.

In step 507, the electronic control unit 20 reads, from the RAM 24, the information on a particular extra route 300B which is one of the one or more extra routes 300A, 300B, and 300C and on which the vehicle 90 will travel after departing from the recommended route 200. Based on the information that has been read, the electronic control unit 20 controls the autonomous driving of the vehicle 90.

In step 508, the electronic control unit 20 controls the autonomous driving of the vehicle 90 to the target position based on the information on the recommended route 200 provided by the navigation device 50.

In step 509, the route search server 500 determines whether the vehicle 90 has arrived at the target position 120.

According to the second embodiment of the present disclosure, before the vehicle 90 passes the diverging point 110 where the vehicle 90 is expected to pass, the route search server 500 searches, in advance, a plurality of routes, from the diverging point 110 to the target position 120, for one or more extra routes 300A, 300B, and 300C other than the recommended route 200. The route search server 500 can temporarily store the information on the extra routes 300A, 300B, and 300C, which have been searched for, in the RAM 24 of the electronic control unit 20. This eliminates the need to search for the extra routes 300A, 300B, and 300C when the vehicle 90 departs from the recommended route 200 at the diverging point 110, preventing an interruption of cooperation between the electronic control unit 20 and the navigation device 50.

The embodiments described above are intended to facilitate understanding of the present disclosure but are not construed as limiting the applicable embodiment. The present disclosure can be modified or improved without departing from the spirit of the present disclosure, and an equivalent thereof is included in the scope of the present disclosure.

What is claimed is:

1. An autonomous driving device comprising:
a navigation device configured to search a plurality of routes, from a diverging point to a target position, for one or more extra routes other than a recommended route before a vehicle passes the diverging point, the diverging point being a point where the vehicle is expected to pass; and
an electronic control unit configured to control autonomous driving of the vehicle based on information on a particular extra route when the vehicle departs from the recommended route at the diverging point and travels on the particular extra route, the particular extra route being one of the one or more extra routes,
wherein the electronic control unit is configured to store the one or more extra routes before the vehicle passes the diverging point,
wherein the navigation device starts a search for the one or more extra routes when a distance between the vehicle and the diverging point becomes shorter than a threshold distance, and
wherein the threshold distance is equal to or greater than a distance that the vehicle travels from a time at which the navigation device starts the search for the one or more extra routes to a time at which the search is completed.

2. The autonomous driving device according to claim 1, wherein the threshold distance is determined based on an estimated time required to search for the one or more extra routes.

3. The autonomous driving device according to claim 1, wherein the threshold distance is determined based on traffic information.

4. An autonomous driving device comprising:
a navigation device configured to receive from a route search server a result of searching a plurality of routes, from a diverging point to a target position, for one or more extra routes other than a recommended route before a vehicle passes the diverging point, the diverging point being a point where the vehicle is expected to pass; and
an electronic control unit configured to control autonomous driving of the vehicle based on information on a particular extra route when the vehicle departs from the recommended route at the diverging point and travels on the particular extra route, the particular extra route being one of the one or more extra routes,
wherein the route search server starts a search for the one or more extra routes when a distance between the vehicle and the diverging point becomes shorter than a threshold distance, and
wherein the threshold distance is equal to or greater than a distance that the vehicle travels from a time at which the route search server starts the search for the one or more extra routes to a time at which the search is completed.

5. The autonomous driving device according to claim 4, wherein the threshold distance is determined based on an estimated time required to search for the one or more extra routes.

6. The autonomous driving device according to claim 4, wherein the threshold distance is determined based on traffic information.

* * * * *